(12) United States Patent
Efthyvoulos et al.

(10) Patent No.: US 11,689,283 B1
(45) Date of Patent: Jun. 27, 2023

(54) FREE-SPACE OPTICAL COMMUNICATION SYSTEM USING A BACKCHANNEL FOR POWER OPTIMIZATION

(71) Applicant: Meta Platforms, Inc., Menlo Park, CA (US)

(72) Inventors: Stephen Philip Efthyvoulos, La Crescenta, CA (US); Eric Douglas Miller, Sherman Oaks, CA (US); Chien-Chung Chen, Thousand Oaks, CA (US); Slaven Moro, San Diego, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/213,712

(22) Filed: Mar. 26, 2021

Related U.S. Application Data

(60) Provisional application No. 63/002,261, filed on Mar. 30, 2020.

(51) Int. Cl.
| | |
|---|---|
| *H04B 10/112* | (2013.01) |
| *H04B 10/118* | (2013.01) |
| *H04B 10/564* | (2013.01) |
| *H04W 16/28* | (2009.01) |
| *H04B 10/50* | (2013.01) |
| *H04W 84/06* | (2009.01) |

(52) U.S. Cl.
CPC ....... *H04B 10/1123* (2013.01); *H04B 10/118* (2013.01); *H04B 10/5057* (2013.01); *H04B 10/564* (2013.01); *H04W 16/28* (2013.01); *H04W 84/06* (2013.01)

(58) Field of Classification Search
CPC ........ H04B 10/11–118; H04B 10/564; H04W 84/06
USPC .................................................. 398/118–131
See application file for complete search history.

(56) References Cited

U.S. PATENT DOCUMENTS

| | | | |
|---|---|---|---|
| 4,635,299 A | 1/1987 | MacGovern | |
| 4,867,560 A | 9/1989 | Kunitsugu | |
| 5,475,520 A | * 12/1995 | Wissinger | ............ H04B 10/118 |
| | | | 398/118 |
| 5,517,016 A | 5/1996 | Lesh et al. | |

(Continued)

FOREIGN PATENT DOCUMENTS

WO  2020/112517 A1  6/2020

OTHER PUBLICATIONS

Roy et al. "Optical Feeder links for High Throughput Satellites", ICSOS IEEE Conference, Oct. 26, 2015, pp. 1-6.

(Continued)

*Primary Examiner* — Li Liu
(74) *Attorney, Agent, or Firm* — Greenberg Traurig, LLP

(57) ABSTRACT

An example device may include an optical modulator configured to generate an optical beam encoding network data, an optical power amplifier configured to adjust a transmitted power of the optical beam, and a transmit beam angle mechanism configured to adjust a beam direction of the optical beam and to transmit the optical beam to a remote receiver over a free-space optical link. Example devices may include a controller configured to receive backchannel data from the remote receiver and modify a characteristic of the optical beam based on the backchannel data. Various other devices, systems, and methods are also disclosed.

15 Claims, 6 Drawing Sheets

(56) References Cited

U.S. PATENT DOCUMENTS

| | | | |
|---|---|---|---|
| 6,239,888 B1* | 5/2001 | Willebrand | H04B 10/1125 398/118 |
| 6,493,122 B1* | 12/2002 | Degura | H04B 10/1125 398/128 |
| 6,731,415 B1 | 5/2004 | Plett | |
| 6,731,833 B2 | 5/2004 | Sandler et al. | |
| 6,775,480 B1* | 8/2004 | Goodwill | H04B 10/11 398/151 |
| 6,819,874 B2 | 11/2004 | Cheng et al. | |
| 7,197,248 B1* | 3/2007 | Vorontsov | H04B 10/1127 398/119 |
| 7,389,052 B2* | 6/2008 | Oettinger | H04B 10/1123 398/127 |
| 7,711,441 B2* | 5/2010 | Tillotson | B60L 53/00 136/246 |
| 7,715,723 B2* | 5/2010 | Kagawa | H04B 10/1141 398/127 |
| 8,362,410 B2 | 1/2013 | King et al. | |
| 8,383,982 B2 | 2/2013 | Bruland et al. | |
| 8,968,098 B2 | 3/2015 | Harari | |
| 9,306,668 B2 | 4/2016 | DeVaul et al. | |
| 9,917,633 B2 | 3/2018 | DeVaul et al. | |
| 10,003,402 B2 | 6/2018 | Boroson et al. | |
| 10,298,325 B1 | 5/2019 | Birnbaum et al. | |
| 10,313,000 B2 | 6/2019 | Buer et al. | |
| 10,365,211 B2 | 7/2019 | Blasenheim et al. | |
| 10,411,829 B2 | 9/2019 | Birnbaum et al. | |
| 2002/0167702 A1 | 11/2002 | Badesha et al. | |
| 2003/0060171 A1* | 3/2003 | Lovberg | H04B 10/1149 455/73 |
| 2003/0219253 A1* | 11/2003 | Kukshya | H04B 10/1121 398/118 |
| 2004/0042798 A1 | 3/2004 | Kehr et al. | |
| 2004/0062551 A1* | 4/2004 | ElBatt | H04B 10/1121 398/115 |
| 2004/0141754 A1 | 7/2004 | Cheng et al. | |
| 2004/0165892 A1* | 8/2004 | Mendenhall | G01S 3/789 398/118 |
| 2006/0018661 A1* | 1/2006 | Green | H04B 10/1127 398/128 |
| 2006/0024061 A1* | 2/2006 | Wirth | H04B 10/1125 398/129 |
| 2006/0062099 A1* | 3/2006 | Yazaki | H04B 10/116 369/44.11 |
| 2006/0165139 A1* | 7/2006 | Sanchez | H01S 5/06835 372/38.1 |
| 2011/0268453 A1 | 11/2011 | Fest et al. | |
| 2012/0308239 A1* | 12/2012 | Sheth | H04B 10/1125 398/131 |
| 2014/0064739 A1* | 3/2014 | Chen | H04B 10/11 398/130 |
| 2015/0188628 A1 | 7/2015 | Chalfant, III et al. | |
| 2015/0215040 A1 | 7/2015 | Dickson et al. | |
| 2015/0249498 A1 | 9/2015 | Minguez Rascon et al. | |
| 2016/0182140 A1 | 6/2016 | DeVaul et al. | |
| 2016/0204861 A1 | 7/2016 | Boroson et al. | |
| 2016/0204865 A1 | 7/2016 | Boroson et al. | |
| 2016/0204866 A1* | 7/2016 | Boroson | H04B 10/61 398/97 |
| 2017/0054499 A1 | 2/2017 | Graves et al. | |
| 2017/0054527 A1 | 2/2017 | Birnbaum et al. | |
| 2017/0183095 A1* | 6/2017 | Liu | H02S 20/30 |
| 2017/0366262 A1 | 12/2017 | Turgeon et al. | |
| 2018/0019816 A1 | 1/2018 | Wang et al. | |
| 2018/0191428 A1 | 7/2018 | Hemmati et al. | |
| 2019/0078858 A1 | 3/2019 | Miller et al. | |
| 2019/0081703 A1 | 3/2019 | Miller et al. | |
| 2019/0245265 A1 | 8/2019 | Booen et al. | |
| 2019/0312640 A1* | 10/2019 | Binkai | H04B 10/6164 |
| 2020/0169323 A1 | 5/2020 | Moro | |
| 2020/0396003 A1 | 12/2020 | Moro | |
| 2021/0286168 A1* | 9/2021 | Pan | H04B 10/671 |

OTHER PUBLICATIONS

Dimitrov et al., "Digital Modulation and Coding for Satellite Optical Feeder Links", ASMS/SPSC Conference (IEEE), Sep. 8, 2014, 10 pages.

Dimitrov et al., "Digital Modulation and Coding for Satellite Optical Feeder Links with Pre-distortion Adaptive Optics", Int. J. Satell. Comm. Network., Nov. 11, 2015, pp. 1-22.

* cited by examiner

FREE-SPACE OPTICAL COMMUNICATION SYSTEM USING A BACKCHANNEL FOR POWER OPTIMIZATION

CROSS REFERENCE TO RELATED APPLICATION

This application claims the benefit of U.S. Provisional Application No. 63/002,261, filed 30 Mar. 2020, the disclosure of which is incorporated, in its entirety, by this reference.

BRIEF DESCRIPTION OF DRAWINGS

The accompanying drawings illustrate a number of exemplary embodiments and are a part of the specification. Together with the following description, these drawings demonstrate and explain various principles of the present disclosure.

Figure 1:
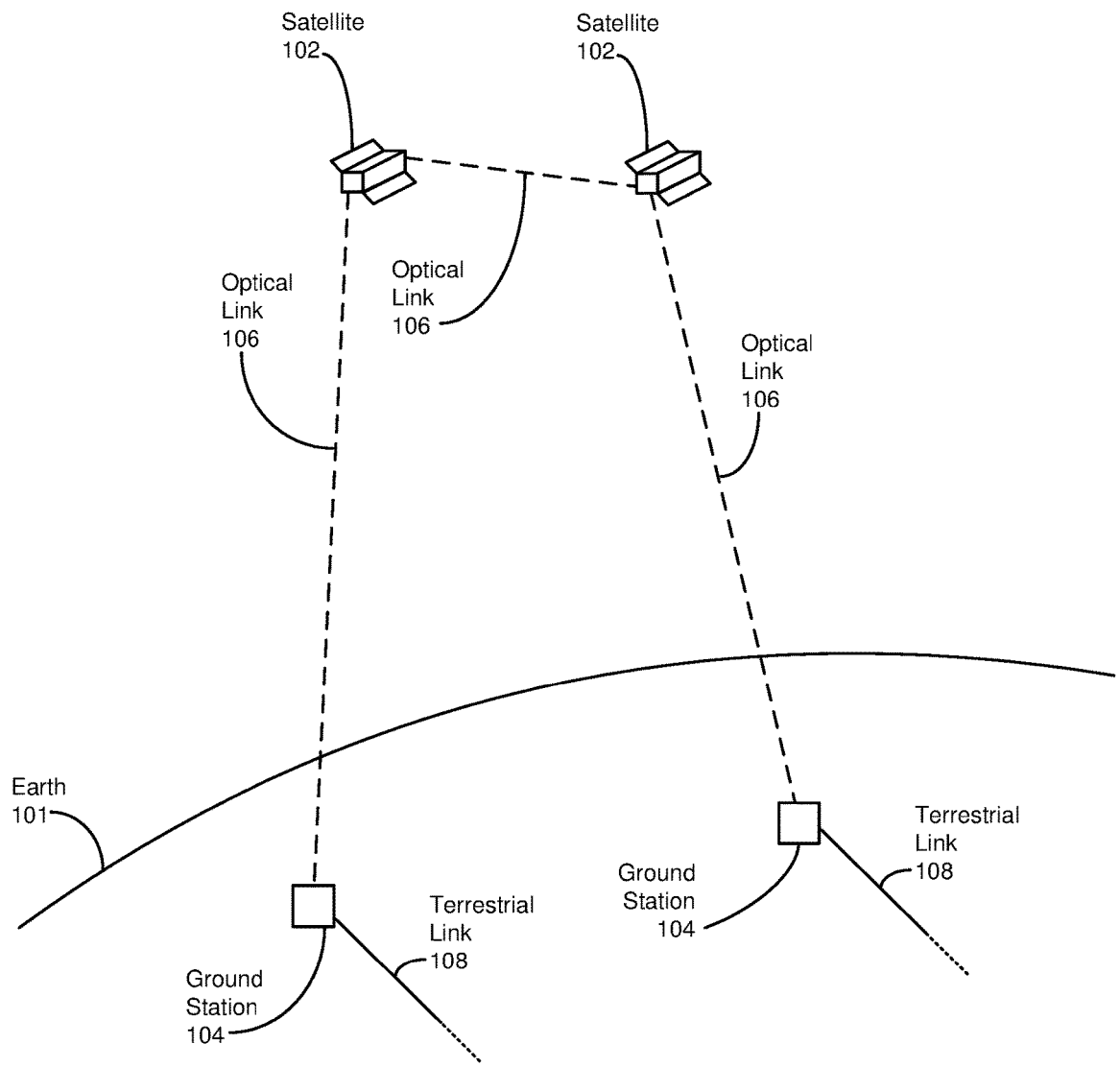
FIG. 1 is a graphical representation of an exemplary satellite optical communication system in which embodiments of a backchannel for power optimization, as discussed herein, may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

Free-space optical communication systems typically employ a light beam that is modulated in some fashion to carry data between a transmitting communication terminal and a receiving communication terminal. In some examples, a pair of communication terminals may exchange data by each terminal operating as both a transmitting terminal and a receiving terminal. Such communication systems may be employed in a variety of environments, including, but not limited to, near-vacuum and/or atmospheric environments.

In some conventional systems, a free-space optical communication terminal may be sensitive to power utilization. For example, a satellite serving as a free-space optical communication terminal may rely on solar and/or battery power to operate various portions of the satellite, including the components employed to generate an optical communication beam.

The present disclosure is generally directed to a free-space optical communication system that may employ a backchannel (e.g., an information channel separate from a corresponding primary communication channel) from a receiving terminal to a transmitting terminal to provide information regarding at least one characteristic of the optical communication signal, as received at the receiving terminal. Based on the at least one characteristic, the transmitting terminal may modify the optical communication signal to improve a power efficiency of the signal. In some embodiments, as is described more fully below, such a system may facilitate efficient power utilization in providing an effective optical communication signal.

Figure 2:
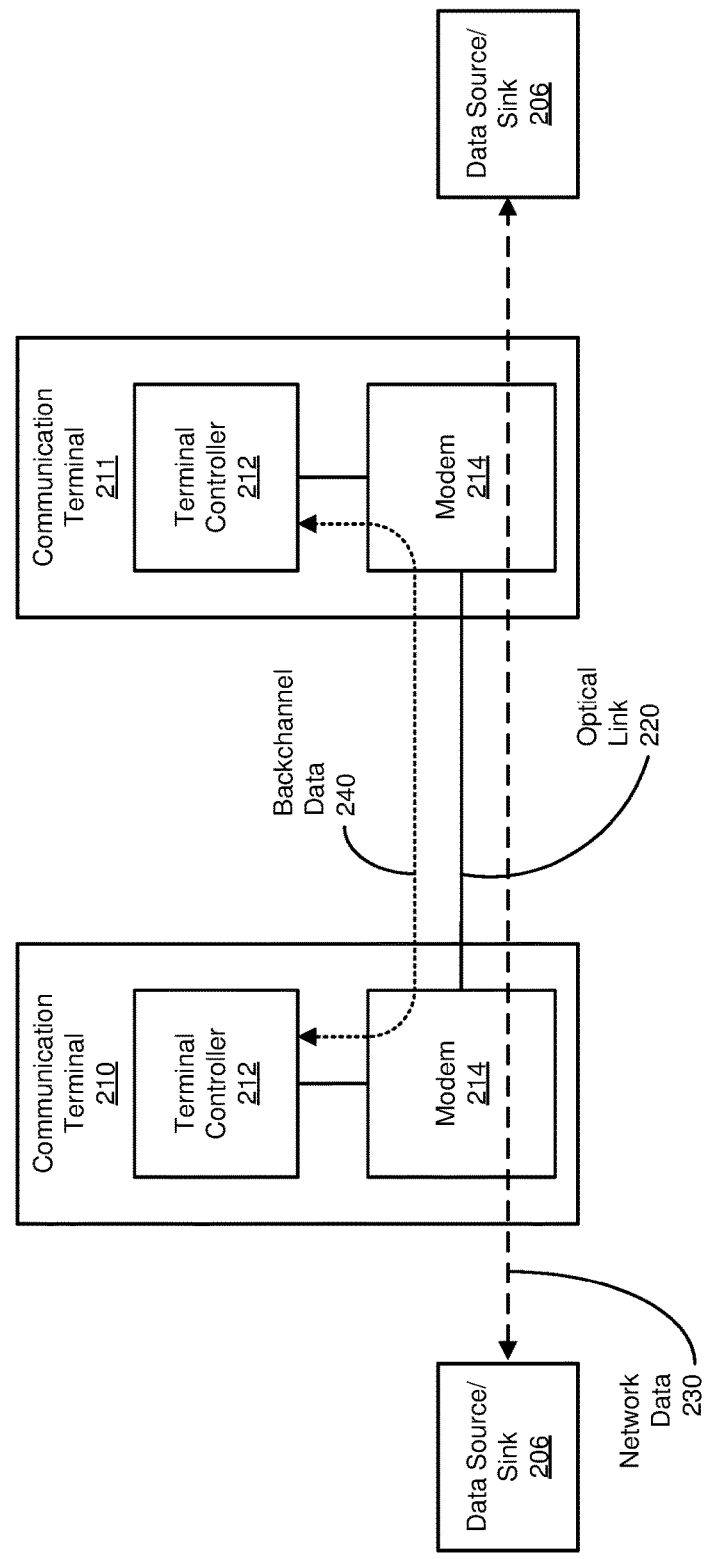
FIG. 2 is a block diagram of a free-space optical communication example employing a data backchannel to optimize power utilization for a free-space optical communication channel.
Figure 3:
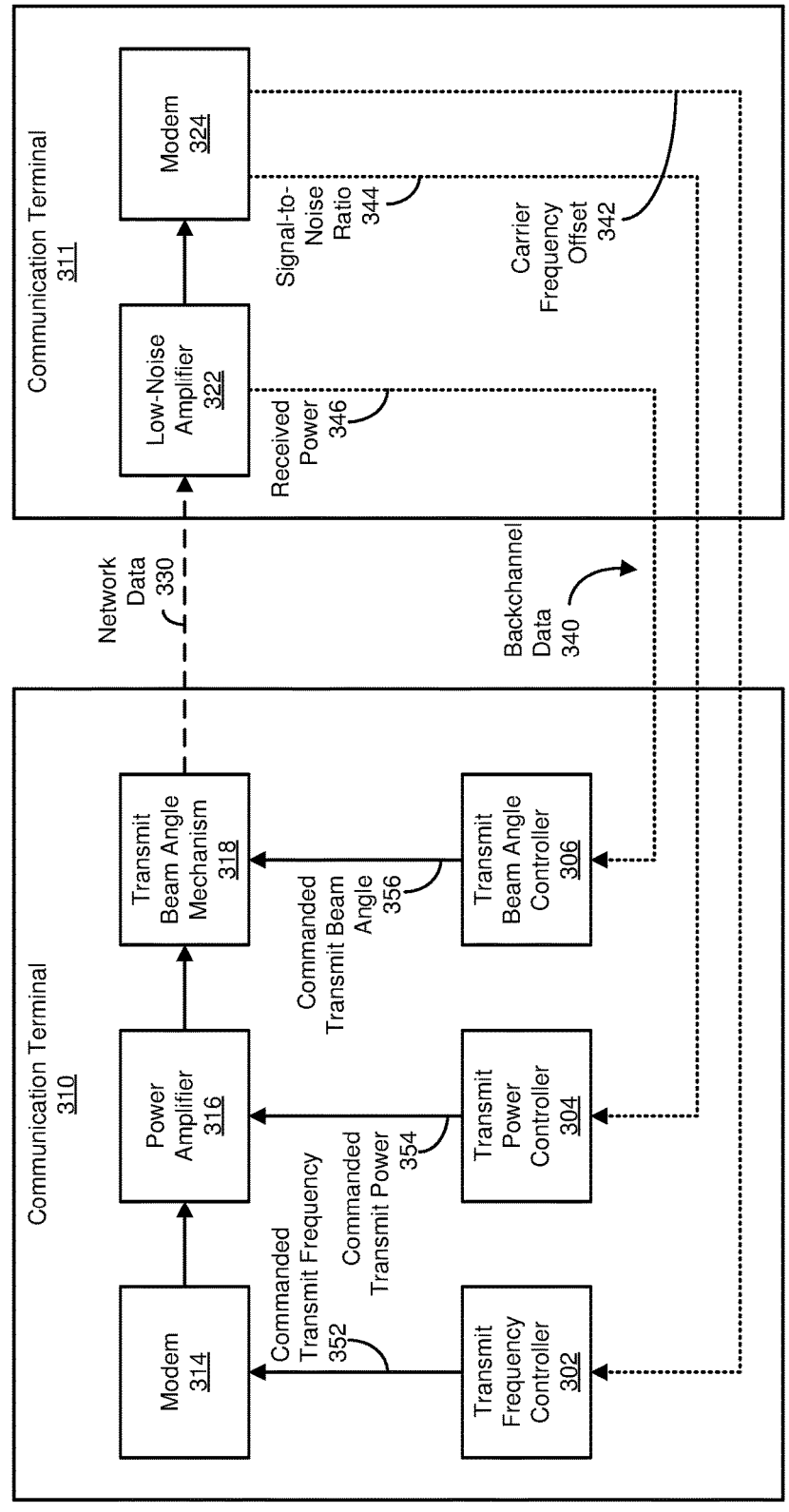
FIG. 3 is a block diagram of another free-space optical communication example employing a data backchannel to optimize power utilization for a free-space optical communication channel.
Figure 4:
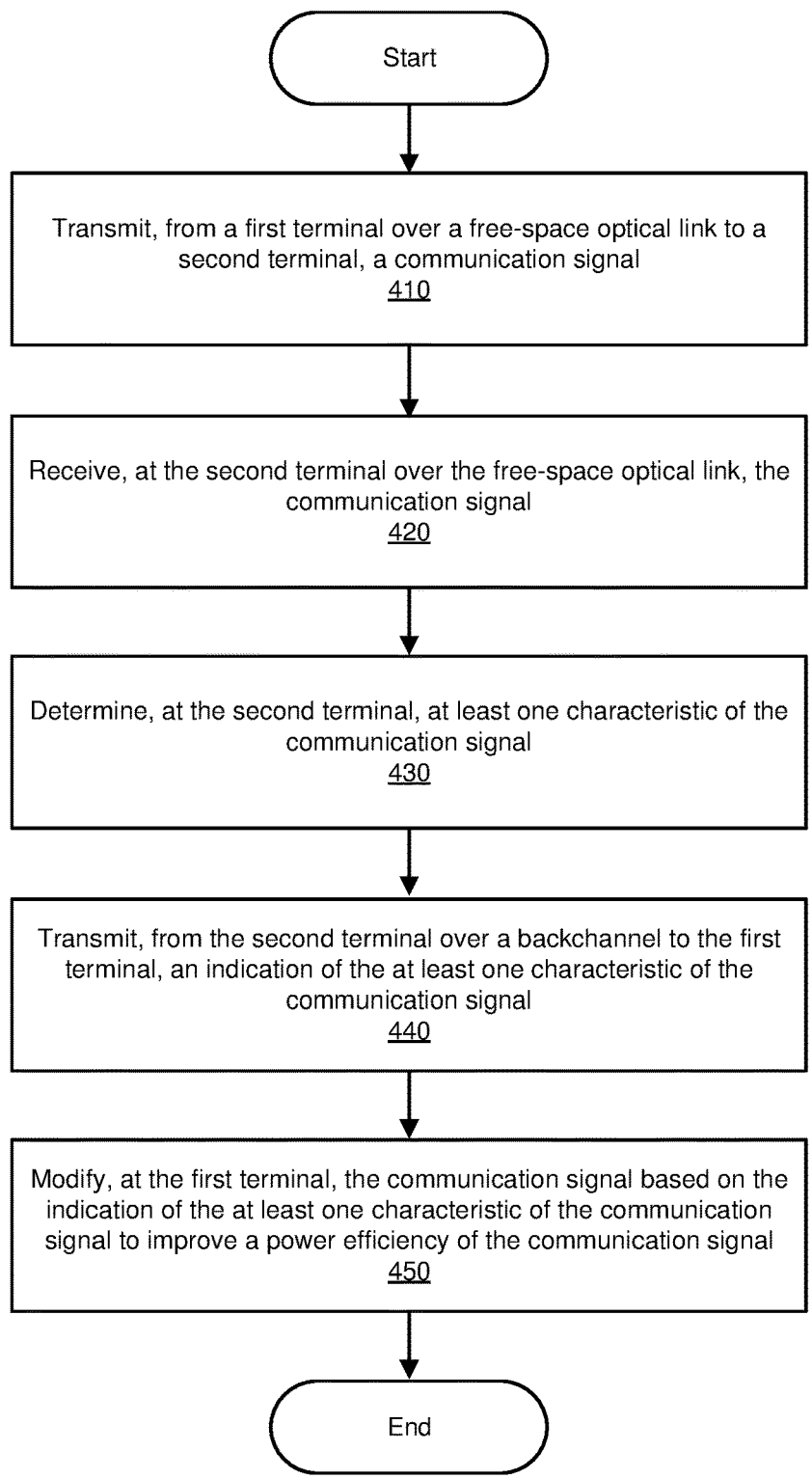
FIG. 4 is a flow diagram of an exemplary method of employing a data backchannel to optimize power utilization for a free-space optical communication channel.
Figure 5:
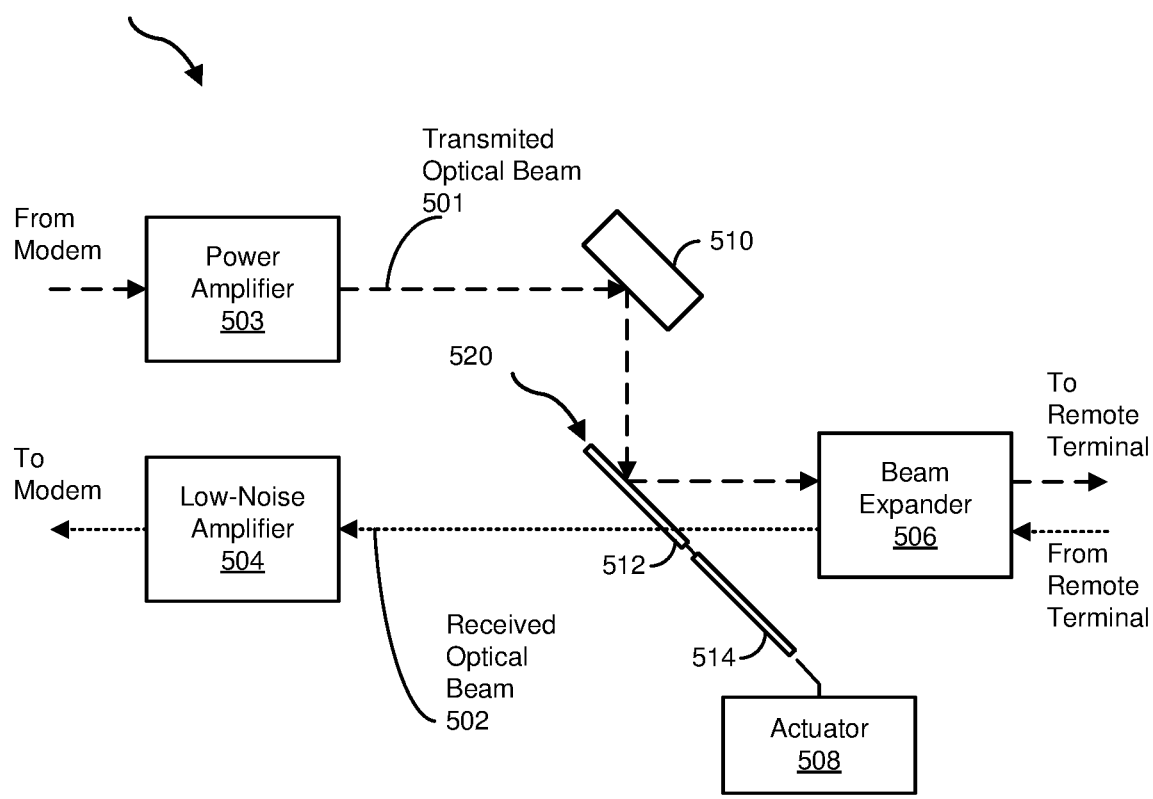
FIG. 5 is a block diagram of an exemplary free-space optics employable in an example optical communication system.
Figure 6:
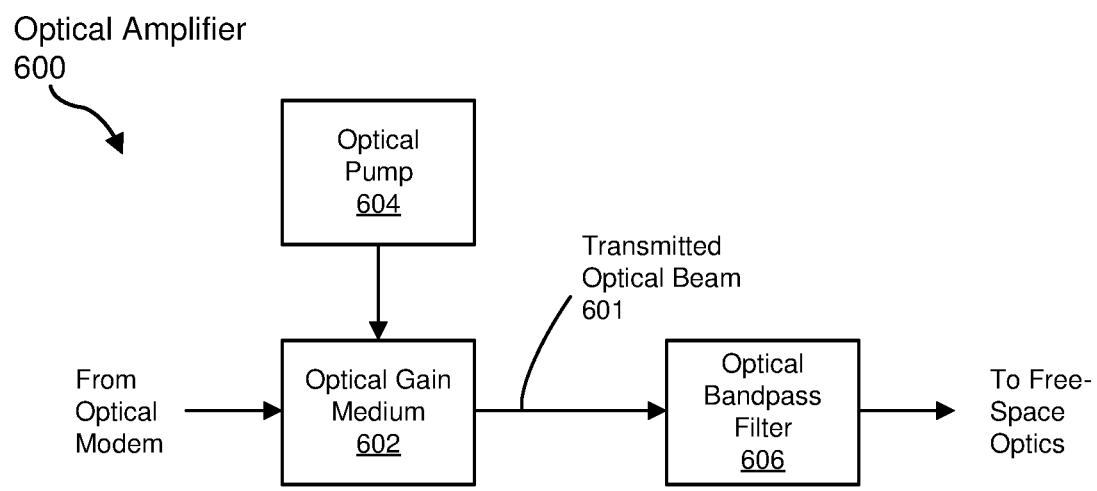
FIG. 6 is a block diagram of an exemplary optical amplifier employable an example the optical communication system.

The following provides, with reference to FIGS. 1-6, detailed descriptions of free-space optical communications systems and devices, such as an optical communication terminal receiving backchannel data relating to received signal characteristics. FIGS. 1-3 illustrate free-space optical communication devices and the use of a backchannel, FIG. 4 illustrates an exemplary method, and FIGS. 5-6 show example configurations that may be used in some embodiments.

FIG. 1 is a graphical representation of an exemplary satellite optical communication system 100 in which embodiments of a backchannel for power optimization, as discussed herein, may be employed. In satellite optical communication system 100, one or more satellites 102 (e.g., low Earth orbit (LEO) communication satellites that may be configured as a communication constellation) may facilitate communication between two or more ground stations 104 (e.g., ground stations that are geographically separated on Earth 101 to an extent that direct communication therebetween is not advisable) using optical links 106. In some examples, each ground station 104 may be coupled to other communication devices via terrestrial links 108 (e.g., wired communication links, wireless communication links, and the like), thus serving as a portion of a larger communication network. In some embodiments, each optical link 106 may operate as a unidirectional or bidirectional communication link. Further, in some examples, each of one or more satellites 102, being reliant upon solar power (e.g., provided via solar panels or cells) and/or battery power, may represent an optical communication terminal that receives data over a backchannel (e.g., from ground station 104 or another satellite 102) to alter the communication signal to render power consumption of satellite 102 more efficient. While FIG. 1 represents one particular example of a free-space optical communication system, other types, such as those that do not employ a satellite as a communication terminal, may also benefit from application of the various principles described in greater detail below.

FIG. 2 is a block diagram of a free-space optical communication example 200 including a first communication terminal 210 and a second communication terminal 211 communicating network data 230 via an optical link 220. As indicated above, a satellite (e.g., satellite 102) may serve as communication terminal 210 and/or 211 in some examples. Each communication terminal 210 and 211 may include a modulator-demodulator (modem) 214 and or a terminal controller 212. In some embodiments, modem 214 may generate and/or receive optical data link 220 (e.g., an optical beam directed from communication terminal 210 to communication terminal 211 and/or vice-versa) that carries communication data. In some examples, modem 214 may modulate an optical beam to encode a communication signal thereon and/or demodulate such a beam to recover the communication signal encoded thereon. Modem 214 may include various electronic and/or optical components (e.g., encoders, decoders, amplifiers, lenses, mirrors, and the like). Further, network data 230 received over optical link 220 at communication terminal 210 or 211 may be forwarded to a data source/sink 206, and network data 230 transmitted over optical link 220 may be sourced by data source/sink 206.

Also, in some embodiments, terminal controller 212 may measure and/or control various operational characteristics or aspects of modem 214 to facilitate successful communication between communication terminals 210 and 211. In some examples described in greater detail below in conjunction with FIG. 3, terminal controller 212 (e.g., terminal controller 212 of communication terminal 210) may receive backchannel data 240 that includes information indicating some characteristic of an optical beam or signal of optical link 220 as received at another communication terminal (e.g., communication terminal 211). As discussed more fully below, backchannel data 240 may be carried over optical link 220 or another communication path (e.g., a radio-frequency (RF) signal).

While FIG. 2 depicts network data 230 over optical link 220 and backchannel data 240 as being transmitted and received bidirectionally, other examples may employ a unidirectional optical link 220 carrying network data 230 in a single direction (e.g., from communication terminal 210 to communication terminal 211). In such examples, backchannel data 240 may be carried in the opposing direction (e.g., from communication terminal 211 to communication terminal 210).

FIG. 3 is a block diagram of another free-space optical communication example 300 employing a data backchannel to optimize power utilization for a free-space optical communication channel. In this particular example, network data 330 is carried over a free-space optical link (e.g., an optical beam) from a communication terminal 310 to a second communication terminal 311, and backchannel data 340 is carried in the opposing direction. In some embodiments, communicational terminal 310 may be a satellite (e.g., satellite 102) that employs backchannel data 340 to control or modify the optical link to attain a power-efficient communication connection. In other embodiments, network data 330 and backchannel data 340 may flow bidirectionally, as mentioned above in connection with FIG. 2.

In some examples, communication terminal 310 may be a satellite, and a backchannel carrying backchannel data 340 from receiving communication terminal 311 to transmitting communication terminal 310 may be implemented in a number of ways. For example, the backchannel may be an in-band data channel (e.g., carried as part of network data 330 carried in an optical beam from communication terminal 311 (e.g., a ground station) to communication terminal 310 (e.g., a satellite)). In other embodiments, the backchannel may be a satellite telemetry, tracking, and commanding (TT&C) link (e.g., an RF or optical link) between communication terminals 310 and 311 that is typically employed for commanding the satellite, as well as for verifying the current status of the satellite. In yet other examples, the backchannel may be implemented by way of modulating (e.g., via amplitude modulation) an optical carrier of an optical communication beam transmitted from communication terminal 311 to communication terminal 310, or a beacon tone of an uplink (e.g., an RF or optical uplink) to carry backchannel data 340 from communication terminal 311 to communication terminal 310. For example, an optical beacon tone transmitted by communication terminal 311 may serve as a source to which communication terminal 310 may direct an optical beam for carrying network data 330. Other embodiments for providing a backchannel from communication terminal 311 and communication terminal 310, including those that involve one or more intermediate terminals or participants, are also possible.

As illustrated in FIG. 3, communication terminal 310 may include a modem 314, a power amplifier 316, and a transmit beam angle mechanism 318 for generating an optical beam carrying network data 330. In some embodiments, modem 314 may modulate an optical signal to carry network data 330. Power amplifier 316, in at least some embodiments, may optically amplify the modulated optical signal to generate an optical beam possessing sufficient power to be received and demodulated at communication terminal 311. Further, transmit beam angle mechanism 318 may direct the generated optical beam (e.g., via electronic, optical, or other means) to more effectively direct the optical beam carrying network data 330 to communication terminal 311 for reception. Other functional blocks may be provided in communication terminal 310 but are not illustrated in FIG. 3 or discussed herein to focus the following discussion.

To control the operation of one or more of modem 314, power amplifier 316, and/or transmit beam angle mechanism 318, communication terminal 310 may include one or more of a transmit frequency controller 302 (to control modem 314), a transmit power controller 304 (e.g., to control power amplifier 316), and/or a transmit beam angle controller 306 (to control transmit beam angle mechanism 318). In some examples, one or more of controllers 302, 304, and 306 may be embodied within a single controller module (e.g., terminal controller 212 of FIG. 2, which may include a hardware controller, a processor configured to execute one or more software instructions, and/or the like). More specifically, in some examples, transmit frequency controller 302 may provide a commanded transmit frequency 352 to modem 314 to employ when modulating a light signal to carry network data 330. Transmit power controller 304 may provide a commanded transmit power 354 to power amplifier 316 to control the transmit power of the optical beam. Also, in some embodiments, transmit beam angle controller 306 may set a commanded transmit beam angle 356 (e.g., a combined tip-and-tilt angle) to be employed by transmit beam angle mechanism 318 to direct the optical beam carrying network data 330 toward communication terminal 311.

As shown in FIG. 3, one or more of controllers 302, 304, and 306 may employ backchannel data 340 received from communication terminal 311 to inform their controller activities. In some embodiments, communication terminal 311 may include a low-noise amplifier 322 and/or a modem 324. For example, low-noise amplifier 322 may optically amplify the optical beam carrying network data 330. Modem 324, in some embodiments, may then demodulate the amplified optical signal to decode or otherwise recover network data 330 therefrom. Other operational modules or components of communication terminal 311, such as various optics and electronics, are not discussed in greater detail to focus the following discussion.

In performing these operations, low-noise amplifier 322 and/or modem 324 may generate information indicative of the status of the optical beam carrying network data 330. For example, low-noise amplifier 322 may determine and generate an indication of a received power 346 (e.g., optical power) of the optical beam. Modem 324, in some embodiments, may determine and generate an indication of a signal-to-noise ratio (SNR) 344 and/or a carrier frequency offset (CFO) 342 associated with the optical beam. In some embodiments, signal-to-noise ratio 344 may be a bit error rate (BER) or other measure of error rate prior to the application of forward error correction (FEC) or other error correction scheme. Also, in some examples, carrier frequency offset 342 may be a measure of the difference between transmitter local oscillator frequency of communication terminal 310 (e.g., as represented in the modulation of the optical beam, as detected by modem 324) and the receiver local oscillator frequency employed by modem 324 to demodulate the received signal. Communication terminal 311 may transmit indications (e.g., numeric values) representing received power 346, signal-to-noise ratio 344, and/or carrier frequency offset 342 via the backchannel as backchannel data 340 to communication terminal 310.

In response, one or more of transmit frequency controller 302, transmit power controller 304, and transmit beam angle controller 306 may employ backchannel data 340 to more efficiently employ power available in communication terminal 310 to provide an operable optical beam carrying network data 330 for successful reception at communication terminal 311. For example, transmit frequency controller 302 may generate commanded transmit frequency 352 to minimize the difference between the transmit local oscillator and the receive local oscillator frequencies, as represented by carrier frequency offset 342 of backchannel data 340. In minimizing that difference, in some examples, reception and decoding of network data 330 may be successful using a comparatively lower amount of optical power employed to generate and transmit the optical beam carrying network data 330.

In some embodiments, transmit power controller 304 may generate commanded transmit power 354 based on signal-to-noise ratio 344 of backchannel data 340 (e.g., to maintain a level of signal-to-noise ratio 344 that maintains operability of the optical beam, such as by maintaining an error rate that is correctable at communication terminal 311). By abstaining from providing a level of transmit power that lowers signal-to-noise ratio 344 to the point that the resulting error rate is close to zero, transmit power controller 304 may provide a lower overall commanded transmit power 354, thus using that power more efficiently while maintaining a functional optical beam carrying network data 330.

Also, in some examples, transmit beam angle controller 306 may use received power 346 of backchannel data 340 to control commanded transmit beam angle 356 that is provided to transmit beam angle mechanism 318. For example, transmit beam angle controller 306 may alter commanded transmit beam angle 356 such that a minimum level of received power 346 is maintained to provide an operable optical beam. Moreover, in some embodiments, transmit beam angle controller 306 may implement a conical scanning ("conscan") algorithm to alter the transmit beam angle over time in a conical manner (e.g., to aid determination of a direction in which the optical beam may progress to maintain the optical link between communication terminals 310 and 311).

While each of controllers 302, 304, and 306 of communication terminal 310 is described above as employing a particular set of backchannel data 340, one or more controllers 302, 304, and 306 may employ additional or alternative backchannel data 340 in other examples to control their corresponding functional components of communication terminal 310 to optimize power utilization.

FIG. 4 is a flow diagram of an exemplary method 400 of employing a data backchannel (e.g., backchannel data 240 or 340) to optimize power utilization for a free-space optical communication channel (e.g., provided by optical link 220). While method 400 is described below as being performed by communication terminals 210, 211, 310, and 311, other communication terminals not specifically described herein may perform the steps of method 400 in other embodiments.

In method 400, at step 410, a communication signal (e.g., an optical beam carrying network data 230 or 330) may be transmitted from a first terminal (e.g., communication terminal 210 or 310) over a free-space optical link (e.g., optical link 220) to a second terminal (e.g., communication terminal 211 or 311). At step 420, the communication signal may be received at the second terminal over the free-space optical link. At step 430, at least one characteristic of the communication signal (e.g., carrier frequency offset 342, signal-to-noise ratio 344, and/or received power 346) may be determined at the second terminal. At step 440, an indication of the at least one characteristic of the communication signal may be transmitted from the second terminal over a backchannel (e.g., as backchannel data 240 or 340) to the first terminal. At step 450, the communication signal may be modified at the first terminal based on the indication of the at least one characteristic of the communication signal to improve a power efficiency of the communication signal.

FIG. 5 is a block diagram of an exemplary free-space optics configuration that may be used in example optical communication systems. FIG. 5 shows free-space optics 500 configured for an example optical communication terminal. An optical signal from an optical source may be encoded with network data using a modem (not shown), and amplified by optical power amplifier 503 to generate the transmitted optical beam 501. The transmitted optical beam may be directed by mirror 510 to adjustable optical element 520, which may be adjusted using actuator 508, and passed through a beam expander towards a remote communication terminal. Actuator 508 may include one or more linear actuators, one or more rotary actuators, one or more other types of actuator, or may include a combination of actuators. Other arrangements capable of moving the adjustable element 520 to a particular location and/or orientation, for example, to direct and/or pass optical signals (e.g., based on their wavelength) may also be used. A signal, such as backchannel data, may be received from the remote terminal, and passed through the beam expander 506 (in the reverse direction) and adjustable optical element 520 to form the received optical beam received by the low-noise amplifier 504. The signal from the low-noise amplifier may be demodulated and the backchannel data and/or other network data extracted.

In some examples, adjustable optical element 520 may include one or more of a mirror, switchable mirror, dichroic element (e.g., dichroic filter), or holographic element. In some examples, the mirror 510 may be an adjustable mirror, and may have an associated actuator.

In some examples, the backchannel data may be received at a different wavelength from the wavelength of the transmitted optical beam. A dichroic element may be used to separate the received optical signal. For example, the adjustable optical element 520 may include one or more dichroic elements (e.g., dichroic elements shown at 512 and 514, such as dichroic filters), or another optical element such as a partially transmissive mirror. In some examples, dichroic elements 512 and 514 may be moved together using actuator 508, or may be two portions of the same unitary element moved using the actuator 508. A dichroic element may reflect light of a first wavelength or range of wavelengths while allowing a second wavelength or range of wavelengths to pass therethrough. In some examples, adjustable optical element may include one or more dichroic elements, mirrors (e.g., fully or partially reflective mirrors such as beam splitters, or total internal reflection based mirrors), or other optical elements.

In some examples, actuator 508 may position a first dichroic element 512 within a path the transmitted optical beam 501 and the received optical beam 502 (which may be or include a backchannel beam). First dichroic element 512 may reflect light of the transmitted wavelength while allowing light of the received wavelength to pass through. Accordingly, when placed in the light path (e.g., at an angle to light received from beam expander 506, such as at 45 degrees), first dichroic element 512 may allow the received optical beam 502 to pass directly to the low-noise amplifier 504, while reflecting the transmitted optical beam 501 to beam expander 506 for transmission to the remote terminal. Other optical elements aside from mirror 510 may be employed to redirect transmitted optical beam 501.

Free-space optics 500 may facilitate the transmission of the transmitted optical beam 501 and the received optical 502 along a single free-space optical link, for example, as two co-located or closely positioned beams, to and from the remote terminal.

The actuator may allow modification of the position and/or orientation (in one or more planes) of adjustable optical element 520 to allow beam steering of the transmitted beam 501. The combination of actuator control, using a transmit beam angle controller, and backchannel data allows the beam direction of the transmitted optical beam to be adjusted to increase the received power at the remote terminal. For example, the terminal controller (including a transmit beam angle controller) may use an iterative algorithm to adjust the beam direction, determine the received power using backchannel data, and further adjust the beam direction in response to received power data to increase the received power at the remote terminal.

FIG. 6 is a block diagram of an exemplary optical amplifier that may be used in example optical communication systems. Optical amplifier 600 includes an optical gain medium 602 configured to receive an optical signal from the modem. The optical signal may be encoded with network data. The optical signal is amplified by the optical gain medium to provide the transmitted optical beam 601, which may be passed through an optical bandpass filter 606. The optical bandpass filter may be a component of the optical amplifier, or may be a separate component. The optical gain medium may be electrically or optically pumped. In the illustrated example, the optical gain medium may be optically pumped by optical pump 604, which may include one or more pump lasers or pump light-emitting diodes.

In some examples, the gain of the optical amplifier may be adjusted by adjusting the emission intensity of the optical pump. A transmit power controller may control the emission intensity of an optical signal source (such as a laser) and/or the emission intensity of the optical pump.

In some examples, a tunable optical filter may be located before the optical gain medium and used to tune the transmitted optical beam.

In some examples, the wavelength of the transmitted optical beam may be adjusted by adjusting the wavelength of the optical signal provided by the modem. For example, an optical source, such as a laser, may have an output wavelength that may be tuned (e.g., electrically, using mode selection, or mechanical adjustment of a mirror, or using an electrically tunable optical element such as an electrooptical element. In some examples, a modem encodes network data (and in some examples, backchannel data) on a transmitted optical beam, for example, using a modulation protocol. In some examples, a modem may extract network data from a received optical beam, and may provide the network data to a communication network.

In some examples, a received optical beam (e.g., received at a communication terminal) may include backchannel data, and one or more characteristics of a transmitted optical beam (e.g., transmitted by the communication terminal) may be adjusted based on the backchannel data.

In some examples, a device may include an optical modulator configured to generate an optical beam encoding network data, an optical power amplifier configured to adjust a transmitted power of the optical beam, and a transmit beam angle mechanism configured to adjust a beam direction of the optical beam and to transmit the optical beam to a remote receiver over a free-space optical link. Example devices may include a controller, configured to receive backchannel data from the remote receiver, and modify a characteristic of the optical beam based on the backchannel data. An example device may be a communication terminal of a free-space optical communication system. Examples also include a free-space optical communication system including one or more such devices.

In some examples, a controller may include at least one of a transmit frequency controller, a transmit power controller, or a transmit beam angle controller. A transmit frequency controller may control the frequency of an optical source, such as a laser. For example, a dispersive element may be adjusted to tune the output frequency of an optical source, such as a laser. A transmit power controller may adjust the emitted power of the optical beam, which may include modifying the power of an optical source and/or the optical gain of an optical amplifier. A transmit power controller may control the emission intensity of an optical pump used with an optical gain medium to amplify the optical signal from the modem. In some examples, a transmit beam angle controller may include one or more of a lens, prism, mirror, or other suitable optical or electrooptical element, for example, using one or more actuators, and/or using one or more electrooptical elements. For example, an actuator assembly (e.g., including actuators for rotation about 1, 2, or 3 axes and/or actuators for translation along 1, 2, or 3 axes) may be used to control the orientation of a mirror or other optical element in order to control the beam direction.

In some examples, a characteristic of the optical beam may include the beam direction, beam power, beam center frequency, number and intensity distribution of beam frequency components, selection of wavelengths from a plurality of possible wavelengths, beam frequency width (e.g., full width half height of a frequency versus intensity spectrum, or other suitable beam frequency width parameter), beam angular divergence, carrier frequency offset, or other characteristic. In some examples, a characteristic of the optical beam may include a characteristic of the beam modulation and/or data encoding, such as data transmission rate, modulation frequency, repetitions of encoded data, number and distribution of check data, and the like.

In some examples, backchannel data may include one or more received characteristics of the optical beam related, for example, to the received characteristics of the beam at a remote receiver. In some examples, backchannel data may include a received power of the optical beam by the remote receiver, carrier frequency offset, or other beam characteristic. In some examples, backchannel data may include a received characteristic of the beam modulation and/or data encoding, such as a data error rate, or a signal-to-noise ratio. In some examples, the controller may adjust one or more characteristic of the optical beam based on the backchannel data, such as the beam direction, beam power, beam frequency, and/or other beam characteristic. In some examples, the controller may include a transmit beam angle controller configured to adjust the beam direction of the optical beam using the transmit beam angle mechanism based on the received power at the remote receiver.

In some examples, data processing may be performed by the receiver, for example, by a controller of the receiver. In some examples, the transmitter may send beam direction data (e.g., beam angle data) over the backchannel, and the receiver may then determine a beam pointing error based on the received power and the beam direction data received over the backchannel. The beam pointing error may then be sent from the receiver to the transmitter over the backchannel. In some examples, beam pointing errors may be sent instead of (or additional to) received power to the transmitter over the backchannel. In some examples, beam direction data may be sent from the transmitter to the receiver over the backchannel, the beam pointing error may be determined at the receiver based on the received power, and the beam pointing error may then be sent from the receiver to the transmitter over the backchannel.

In some examples, the transmitter and receiver may be time synchronized (e.g., using a global positioning system (GPS)), and one or more beam directions (e.g., beam pointing angles) may be predetermined so that the receiver may determine the beam direction for a particular time, and associate a beam pointing error with the beam direction based on the received power. For example, the receiver may determine the beam direction based on a time signal from the GPS. The receiver may then determine the beam pointing error for the particular beam direction based on the received power. In some examples, the receiver may determine a preferred beam direction (e.g., including a beam pointing angle) based on the received signal strengths for a plurality of beam directions, and the preferred beam direction may be sent to the transmitter over the backchannel. In some examples, beam pointing errors (e.g., for one or more beam directions) may be sent over the backchannel to the transmitter, and the transmitter may adjust the beam direction to a preferred beam direction based on the beam pointing errors. Using time synchronization between the transmitter and receiver, the use of predetermined beam directions (such as data including one or more beam directions versus time) may allow the receiver to determine beam pointing errors based on the received power, for example, using beam directions associated with times stored in a memory of the receiver. In some examples, the transmitter and/or the receiver may send a time synchronization signal over the backchannel. Beam direction errors, which may also be termed pointing angle errors, may be sent from the receiver to the transmitter over the backchannel (instead of or additional to the received power). In some examples, the transmitter may adjust the beam direction algorithmically based on received beam pointing errors. In some examples, power optimization may include obtaining an appreciable increase in power efficiency (e.g., through a beam direction adjustment, or other adjustment).

In some examples, the backchannel data may be received over the same free-space optical link as used to transmit the optical beam. For example, the free-space optical link may be bidirectional, and the device may be configured to receive the backchannel data over the bidirectional free-space optical link. In some examples, the device may be configured to receive the backchannel data over a radio-frequency link, other electromagnetic frequency link, or other communication link.

In some examples, a system may include one or more controllers, such as a controller including at least one physical processor; physical memory including computer-executable instructions that, when executed by the physical processor, cause the controller to determine at least one characteristic of a received optical beam, and transmit backchannel data to the remote transmitter over a free-space optical link. In some examples, a transmitter and a receiver may each include a controller. In some examples, a transmitter may transmit network data to a receiver, where the terms transmitter and receiver may refer to the transmission of the particular network data. However, in some examples, the receiver (e.g., of the network data) may transmit data, such as backchannel data, to the transmitter (e.g., of the network data). In some examples, a transmitter (e.g., of network data) may receive data from a remote source, which may be a receiver (e.g., of the network data) or other remote source, and the received data may include different network data (which may be termed second network data). In some examples, a receiver of the network data may transmit data (e.g., backchannel data) to a remote location, such as the transmitter of the network data. In some examples, the computer-executable instructions may cause the controller of a communication terminal to modify a characteristic of an optical beam transmitted by the communication terminal based on backchannel data received from a remote terminal. The backchannel data may relate to received characteristics of the optical beam at the remote terminal.

In some examples, a non-transitory computer-readable medium including one or more computer-executable instructions that, when executed by at least one processor of a controller of a communication terminal, cause the controller to modify a characteristic of an optical beam transmitted by the communication terminal based on backchannel data received from a remote terminal. The backchannel data may relate to received characteristics of the optical beam at the remote terminal.

In some examples, a device may include an optical amplifier configured to receive an optical beam from a remote transmitter over a free-space optical link, an optical demodulator configured to demodulate the optical beam and generate network data from the optical beam. The device may further include a terminal controller which may also be referred to more concisely as a controller), configured to determine at least one characteristic of the optical beam, and transmit backchannel data to the remote transmitter including the at least one characteristic of the optical beam. The at least one characteristic of the optical beam may include at least one received characteristic of the optical beam, such as the received power of the optical beam. Transmission of a characteristic of the optical beam over the backchannel may include transmission of a parameter (such as a numerical parameter) based on one or more measured characteristics of the optical beam and/or one or more measured characteristics of encoded data. In some examples, backchannel data may include at least one received characteristic of the beam modulation and/or encoded data, such as a data error rate for network data obtained from the optical beam. In some examples, the device may be configured to transmit the backchannel data to the remote transmitter over the free-space optical link, for example, where the free-space optical link is bidirectional. In some examples, a device may be further configured to transmit a transmitted optical beam to the remote terminal, receive remote backchannel data from the remote terminal, and adjust at least one transmission characteristic of the transmitted optical beam based on the remote backchannel data. The remote backchannel data may include one or more received characteristics of the transmitted beam at the remote terminal, such as remote received power. The device may be configured to adjust at least one transmission characteristic of the transmitted beam, such as at least one of transmitted beam direction or transmitted beam power of the transmitted optical beam.

Examples include devices and methods that may improve power efficiency for generating an optical communication link within a free-space optical communication system. In some embodiments, a transmitting communication terminal (e.g., which may be termed a transmitter, and may include a satellite or other spacecraft) may generate an optical signal (e.g., an optical beam) carrying communication data for reception by a receiving communication terminal (e.g., which may be termed a receiver, and may include a ground station). The receiver may determine one or more characteristics of the received optical signal and provide data concerning the characteristics of the received beam (e.g., the optical power of the received signal, a signal-to-noise ratio (SNR) of the carried data, or other characteristic) via a backchannel (e.g., a satellite telemetry, tracking, and commanding (TT&C) link, an amplitude-modulated optical carrier, radio-frequency link, or other communications link) to the transmitter. The transmitter may then modify or control one or more aspects of the optical signal based on the received backchannel data to improve power consumption efficiency in generating the optical signal. In some examples, this may facilitate the generation of a functional optical communication signal in a more power-efficient manner, and in some examples may retain some power in reserve on the transmitter, which may be used to perform other functions at the terminal. Example approaches may include beam adjustments that may, for example, increase power efficiency without obtaining full optimization.

In some examples, a method includes receiving a communication signal over a free-space optical link from a remote communication terminal, determining at least one characteristic of the communication signal, and transmitting backchannel data to the remote communication terminal. The backchannel data may include an indication of at least one characteristic of the communication signal, such as a received power at the remote communication terminal, or a bit error rate. One or more characteristics of the communication signal may be modified at the remote terminal based on the backchannel data received at the remote terminal.

In some examples, a method includes transmitting a communication signal over a free-space optical link to a remote communication terminal, receiving backchannel data from the remote communication terminal, and modifying the communication signal based on the backchannel data. The backchannel data may include an indication of at least one characteristic of the communication signal, such as a received power at the remote communication terminal, or a bit error rate at the remote communication terminal. The communication signal may be modified based on the backchannel data, for example, by modifying a transmitted beam characteristic such as beam direction, beam intensity, beam wavelength, beam modulation protocol, or other modification to the transmitted beam.

In view of the discussion above in conjunction with FIGS. 1-6, a transmitting communication terminal, such as a satellite or other spacecraft, may receive information describing one or more aspects of an optical beam or other optical link, as received at a receiving communication terminal (e.g., a ground station or another spacecraft) in order to control or modify the optical link in such a way that maintains functionality of the link while limiting the amount of power expended to provide that link. Such embodiments may result in the availability of more power at the transmitting terminal for other functions performed by the terminal, such as navigation, propulsion, and the like.

EXAMPLE EMBODIMENTS

Example 1: In some examples, a device may include: an optical modulator configured to generate an optical beam, where the optical beam encodes network data; an optical power amplifier configured to adjust a transmitted power of the optical beam; a transmit beam angle mechanism, configured to adjust a beam direction of the optical beam and transmit the optical beam to a remote receiver over a free-space optical link; and a controller, configured to receive backchannel data from the remote receiver and modify a characteristic of the optical beam based on the backchannel data.

Example 2. The device of example 1, where the controller includes at least one of a transmit frequency controller, a transmit power controller, or a transmit beam angle controller.

Example 3. The device of any of examples 1 or 2, where the characteristic of the optical beam is the beam direction.

Example 4. The device of any of examples 1-3, where the backchannel data includes a received power of the optical beam by the remote receiver.

Example 5. The device of any of examples 1-4, where the characteristic of the optical beam is beam power, and the controller includes a transmit power controller configured to modify the beam power of the optical beam based on the received power of the optical beam by the remote receiver.

Example 6. The device of any of examples 1-5, where the characteristic of the optical beam is the beam direction, and the controller includes a transmit beam angle controller configured to adjust the beam direction of the optical beam using the transmit beam angle mechanism based on the backchannel data.

Example 7. The device of any of examples 1-6, where the free-space optical link is bidirectional, and the device is configured to receive the backchannel data over the free-space optical link.

Example 8. The device of any of examples 1-7, where the backchannel data includes a beam pointing error determined by the remote receiver.

Example 9. The device of any of examples 1-8, where the device is configured to receive the backchannel data over a radio-frequency link.

Example 10. In some examples, a device may include an optical amplifier configured to receive an optical beam from a remote transmitter over a free-space optical link, an optical demodulator configured to demodulate the optical beam and generate network data from the optical beam, and a terminal controller configured to determine at least one characteristic of the optical beam and transmit backchannel data to the remote transmitter including the at least one characteristic of the optical beam.

Example 11. The device of example 10, where the at least one characteristic of the optical beam includes a received power of the optical beam.

Example 12. The device of any of examples 10 or 11, where the free-space optical link is bidirectional, and the device is configured to transmit the backchannel data to the remote transmitter over the free-space optical link.

Example 13. The device of any of examples 10-12, where the device is configured to determine a beam pointing error from a received power of the optical beam, and the at least one characteristic of the optical beam includes the beam pointing error.

14. The device of any of examples 10-13, where the device is configured to transmit the backchannel data to the remote transmitter over a radio-frequency link.

Example 15. The device of any of examples 10-14, where the device is further configured to transmit a transmitted optical beam to the remote transmitter receive remote backchannel data from the remote transmitter, and adjust at least one transmission characteristic of the transmitted optical beam based on the remote backchannel data.

Example 16. The device of example 15, where the remote backchannel data includes remote received power, and the at least one transmission characteristic includes at least one of transmitted beam direction or transmitted beam power of the transmitted optical beam.

Example 17. In some examples, a method may include receiving (at a communication terminal) a communication signal over a free-space optical link from a remote communication terminal, determining (at the communication terminal) at least one characteristic of the communication signal, and transmitting (from the communication terminal to the remote communication terminal) backchannel data that includes an indication of the at least one characteristic of the communication signal.

Example 18. The method of example 17, where the indication of the at least one characteristic of the communication signal includes a received power.

Example 19. The method of any of examples 17 or 18, where the indication of the at least one characteristic of the communication signal includes a bit error rate.

Example 20. The method of any of examples 17-19, further including modifying (at the remote communication terminal) the communication signal based on the backchannel data.

As detailed above, controllers used to control device operational parameters may include computing devices, and may broadly include any type or form of computing device or system capable of executing computer-readable instructions. Computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor. A controller may include one or more physical processors.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed (such as sensor data), transform the data, output a result of the transformation to control an aspect of device operation (such as modification of a characteristic of an optical beam), use the result of the transformation to control an aspect of device operation (e.g., actuator operation), and store the result of the transformation to control an aspect of device operation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
an optical modulator configured to generate an optical beam, wherein the optical beam encodes network data and has a beam intensity, a beam direction and a carrier frequency;
an optical power amplifier configured to adjust a transmitted power of the optical beam;
a transmit beam angle mechanism, configured to:
adjust the beam direction; and
transmit the optical beam to a remote receiver over a free-space optical link; and
a controller, configured to:
receive backchannel data from the remote receiver comprising a received power, a bit error rate, and a carrier frequency offset between local oscillator frequencies used by the device and the remote receiver; and
modify a plurality of characteristics of the optical beam based on the backchannel data, the plurality of characteristics comprising:
adjustment of the beam intensity to maintain the bit error rate at a level that is correctable by the remote receiver while not further increasing the beam intensity; and
adjustment of the carrier frequency to reduce the carrier frequency offset,
wherein the carrier frequency offset is a difference between a local oscillator frequency of the device and a second local oscillator frequency of the remote receiver and is minimized to reduce the transmitted power of the optical beam for the bit error rate.

2. The device of claim 1, wherein the controller comprises at least one of a transmit frequency controller configured to adjust the carrier frequency, a transmit power controller, or a transmit beam angle controller.

3. The device of claim 1, wherein:
the controller comprises a transmit power controller configured to modify a beam power of the optical beam based on the received power of the optical beam by the remote receiver.

4. The device of claim 1, wherein:
the controller comprises a transmit beam angle controller configured to adjust the beam direction of the optical beam using the transmit beam angle mechanism based on the backchannel data.

5. The device of claim 1, wherein the free-space optical link is bidirectional, and the device is configured to receive the backchannel data over the free-space optical link.

6. The device of claim 1, wherein the backchannel data includes a beam pointing error determined by the remote receiver.

7. The device of claim 1, wherein the device is configured to receive the backchannel data over a radio-frequency link.

8. A device comprising:
an optical amplifier, configured to receive an optical beam from a remote transmitter over a free-space optical link;
an optical demodulator, configured to demodulate the optical beam and generate network data from the optical beam; and
a terminal controller, configured to:
determine at least one characteristic of the optical beam; and
transmit backchannel data to the remote transmitter including the at least one characteristic of the optical beam, wherein the backchannel data comprises a received power, a bit error rate, and a carrier frequency offset between local oscillator frequencies used by the device and the remote transmitter; and
wherein the device is further configured to:
transmit a second optical beam to the remote transmitter; and
receive remote backchannel data from the remote transmitter, and based on the remote backchannel data:
adjust a second beam intensity of the second optical beam to maintain a second bit error rate that is correctable by the remote transmitter while not further increasing the beam intensity; and
adjust a second carrier frequency of the second optical beam to reduce the carrier frequency offset, wherein:
the carrier frequency offset is a difference between a local oscillator frequency of the device and a second local oscillator frequency of the remote receiver and is minimized to reduce the transmitted power of the optical beam for the bit error rate.

9. The device of claim 8, wherein the free-space optical link is bidirectional, and the device is configured to transmit the backchannel data to the remote transmitter over the free-space optical link.

10. The device of claim 8, wherein the device is configured to determine a beam pointing error from the received power of the optical beam, and the at least one characteristic of the optical beam includes the beam pointing error.

11. The device of claim 8, wherein the device is configured to transmit the backchannel data to the remote transmitter over a radio-frequency link.

12. The device of claim 8, wherein:
the remote backchannel data comprises remote received power.

13. A method, comprising:
receiving, at a communication terminal, a communication signal over a free-space optical link from a remote communication terminal;
determining, at the communication terminal, at least one characteristic of the communication signal;
transmitting, from the communication terminal to the remote communication terminal, backchannel data including an indication of the at least one characteristic of the communication signal, wherein the backchannel data comprises a received power, a bit error rate, and a carrier frequency offset between a local oscillator frequencies used by the communication terminal and the remote communication terminal; and
modifying, at the remote communication terminal, the communication signal based on the backchannel data, wherein:
the communication signal comprises an optical beam;
modifying the communication signal comprises:
adjustment of a beam intensity of the optical beam to maintain the bit error rate at a value that is correctable by the communication terminal while not further increasing the beam intensity; and adjustment of the carrier frequency of the optical beam to reduce a carrier frequency offset between the communication terminal and the remote communication terminal; and the carrier frequency offset is a difference between a local oscillator frequency of the device and a second local oscillator frequency of the remote receiver and is minimized to reduce the transmitted power of the optical beam for the bit error rate.

14. The method of claim 13, further comprising correcting, by the communication terminal, bit errors using forward error correction.

15. The method of claim 13, wherein modifying, at the remote communication terminal, the communication signal based on the backchannel data comprises adjusting a beam carrier frequency of the free-space optical link to reduce the carrier frequency offset.

* * * * *